Nov. 11, 1930.  A. C. BECKWITH ET AL  1,780,964
AUTOMATIC DRIFTING VALVE FOR STEAM LOCOMOTIVES
Filed Aug. 8, 1925  2 Sheets-Sheet 1
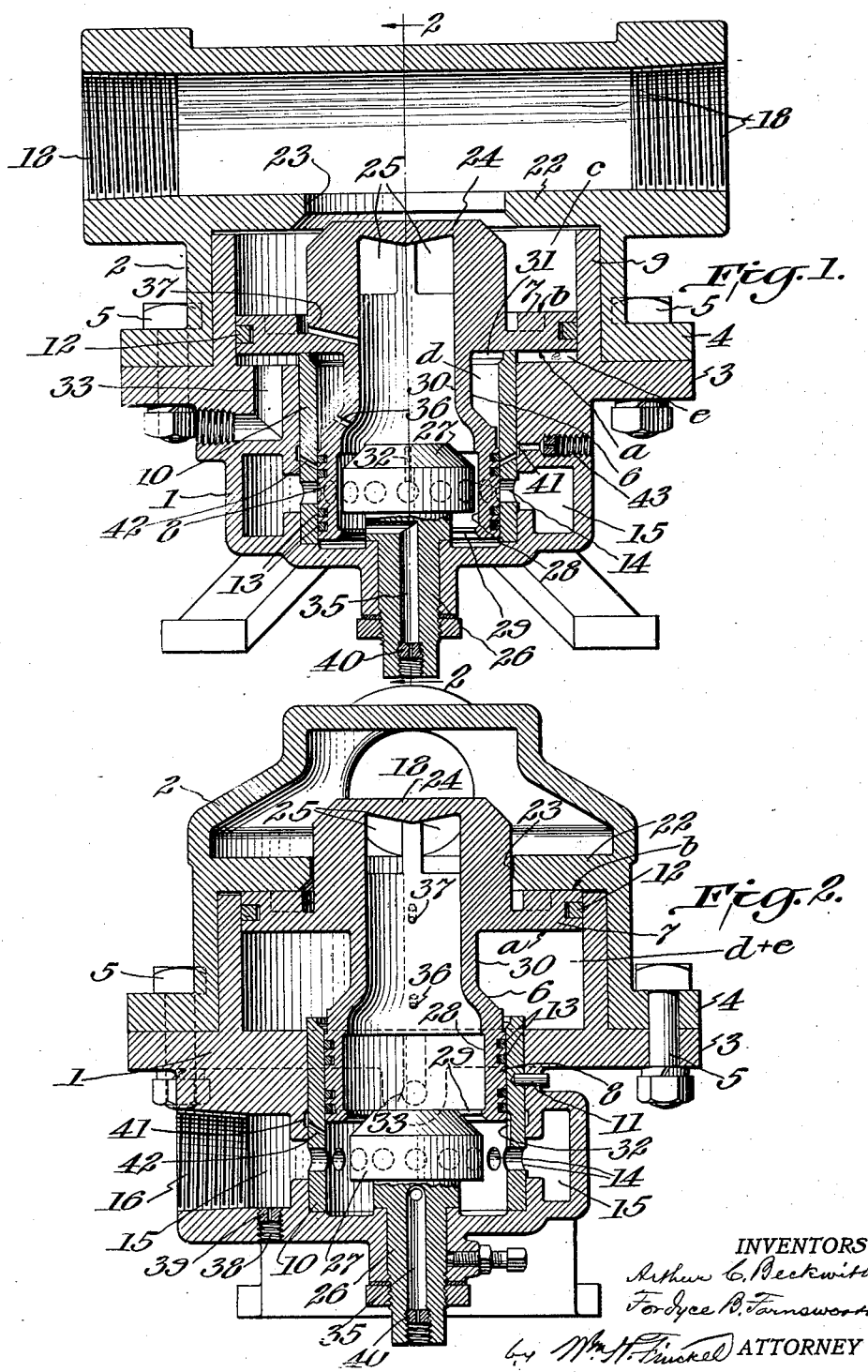
INVENTORS:
Arthur C. Beckwith
Fordyce B. Farnsworth
by Wm. H. Finckel ATTORNEY

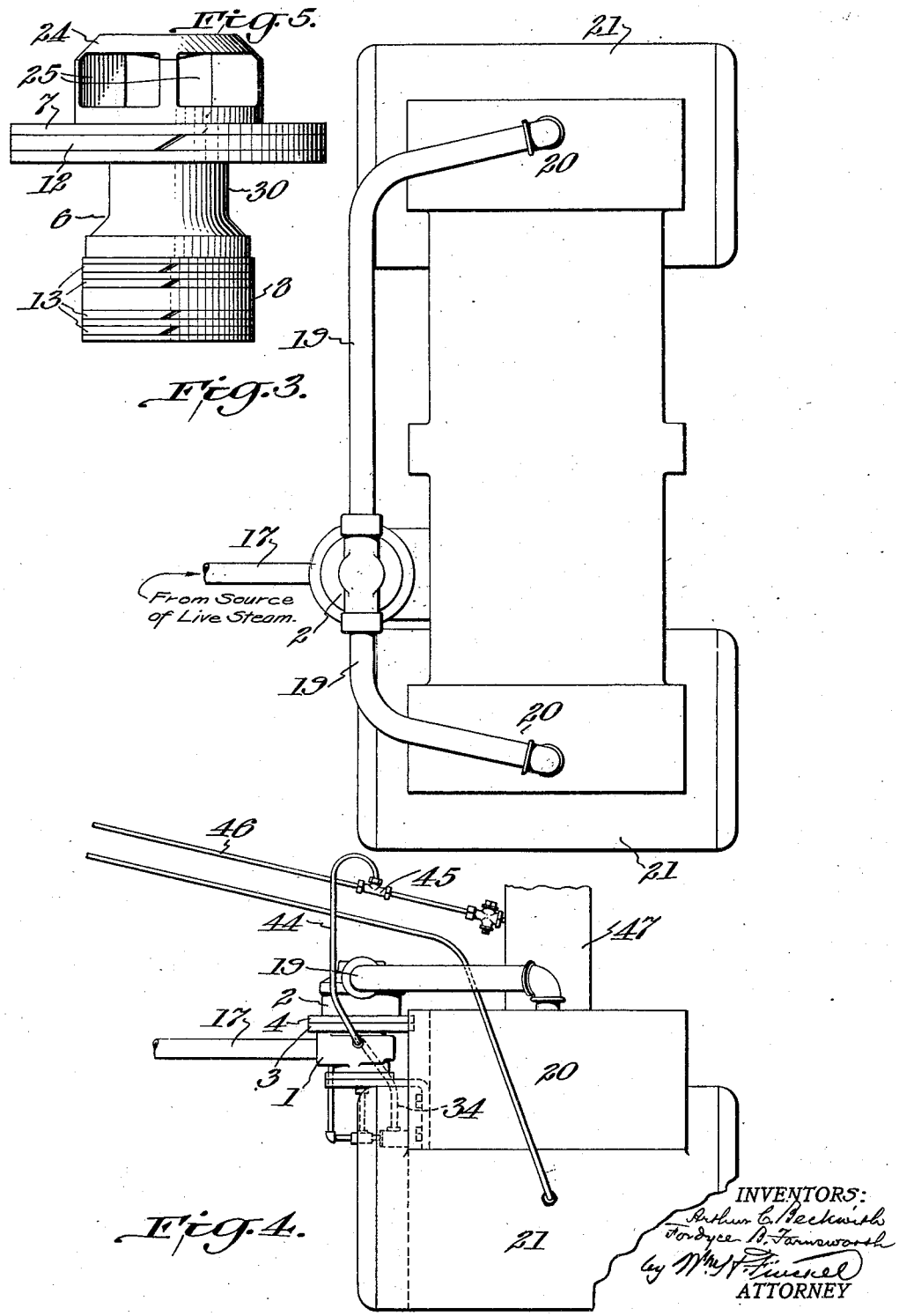

Patented Nov. 11, 1930

1,780,964

UNITED STATES PATENT OFFICE

ARTHUR C. BECKWITH, OF CHICAGO, ILLINOIS, AND FORDYCE B. FARNSWORTH, OF WADSWORTH, OHIO, ASSIGNORS TO CHICAGO LUBRICATOR COMPANY, OF CHICAGO, ILLINOIS, A CORPORATION OF ILLINOIS

AUTOMATIC DRIFTING VALVE FOR STEAM LOCOMOTIVES

Application filed August 8, 1925. Serial No. 49,010.

As is well known, in locomotive engines operating upon superheated steam as a motive fluid, when the engine throttle is closed, as when the locomotive is upon a down grade, is approaching a stop, or otherwise drifting, it takes only a few reciprocations of the engine pistons to clear the cylinders of all steam, and this, due to the sucking into the cylinders of air and gases and to the excessive heat in such cylinders caused by the superheated steam, will cause flashing of the lubricant used in the cylinders, thus consuming such lubricant and forming carbon deposits resulting in friction and consequent wear upon the cylinders, pistons and piston rings.

The object of this invention is to provide an automatic steam control for supplying the engine cylinders, when the locomotive is drifting, with a suitable amount of saturated steam direct from the boiler, whereby the lubricant in the cylinders will be prevented from flashing when the throttle is closed and the locomotive is drifting, and any damage to the cylinders and pistons which might be caused by the excessive heat as above explained, prevented. Moreover, this steam cushions the reciprocating parts.

We are aware that various devices, commonly known as drifting valves, have been provided for this purpose, but in all of such drifting valves with which we are familiar, the formation of a partial vacuum in the engine cylinders, with its attendant danger of flashing of the lubricant due to overheating, is necessary for their proper operation. In the device of our invention, however, we provide a valve for controlling the admission of saturated steam from the boiler to the engine cylinders, in which the pressures are so balanced that saturated steam will be introduced into the engine cylinders almost immediately upon the closing of the throttle and before any vacuum is formed in the cylinders, thereby at all times, while the locomotive is drifting, supplying an amount of steam to the cylinders sufficient to prevent overheating of same and consequent flashing of the lubricant therein. And, moreover, by our device the amount of steam fed is graduated in accordance with the speed of the pistons.

The invention consists, in a broad sense, in an automatic steam control for drifting locomotives, including means for connecting the engine cylinders of the locomotive with a source of saturated steam, preferably the locomotive boiler, and a valve interposed in the connection between the boiler and the engine cylinders and responsive to the combined pressures of the steam at steam chest pressure, saturated steam and steam exhausted by the engine cylinders, to admit saturated steam into the engine cylinders, this valve being capable of operation to admit saturated steam to the engine cylinders in amounts graduated in accordance with the speed of the pistons when the throttle is closed, and being normally held in position to prevent admission of saturated steam to the engine cylinders under the influence of steam chest pressure acting upon it when the throttle is open, as we will proceed now to explain and finally claim.

In the accompanying drawings illustrating the invention, in the several figures of which like parts are similarly designated, Figure 1 is a central vertical section of the valve embodying our invention showing the parts in closed position. Fig. 2 is a section taken on line 2—2 of Fig. 1 and looking in the direction of the arrows, but showing the parts in open position. Fig. 3 is a plan view of the engine cylinders and steam chests of a locomotive showing the arrangement of our invention in combination therewith. Fig. 4 is a side elevation of the parts shown in Fig. 3 and indicating also the pipes for supplying lubricant to the engine cylinders and to the device of our invention. Fig. 5 is a detail view of the piston valve.

The valve of our invention has a casing formed of a body 1 and a cap 2, the body and cap being united by means of complementary flanges 3 and 4, respectively, bolted together as indicated at 5, or otherwise suitably secured.

Mounted within the body 1 is a valve member preferably in the form of a piston valve 6 having a piston head 7, provided with a lower or bottom face or side $a$ and an upper or top face or side $b$, and this valve is provided with an extension 8 which operates to open and close communication between the source of saturated steam and the steam chests of the locomotive engine cylinders, as will be hereinafter more fully pointed out.

The piston head 7 is arranged to travel in a cylinder 9 preferably formed upon the body 1, and the extension 8 of the valve is arranged for sliding movement in a sleeve 10 carried within the body and appropriately positioned therein by means of a pin 11 (Fig. 2).

A suitable piston or packing ring 12 is provided for the piston head 7, and a plurality of packing rings 13 arranged in upper and lower series, are carried by the extension 8.

The sleeve 10 is formed with a plurality of openings 14 which communicate with an annular passage 15 formed in the body 1, and into this annular passage 15 saturated steam from the locomotive boiler is introduced through an opening 16 to which is connected a pipe 17 (Figs. 3 and 4) leading to the steam dome, or other suitable source of saturated steam, of the locomotive boiler.

The cap 2 is provided with openings 18 to which are connected pipes 19 (Figs. 3 and 4) which lead to the steam chests 20 of the engine cylinders 21. Said cap is formed with a baffle or abutment 22 apertured as at 23 to establish communication with the space $c$ of the cylinder 9.

The piston head 7 of the valve 6 is provided with an extension 24 of apertured spider formation as indicated at 25 to reduce the area of the opening 23 when the valve is in its raised or open position so that the open position of the valve will not be affected by the saturated steam in chamber $c$ until the pressure therein is built up by pressure in the steam chests.

Mounted in the extreme lower portion of the body 1 is a plug 26 having a head 27 arranged for cooperation, during sliding movement of the valve 6, with a counterbored portion 28 of the extension 8 and with a circumferential lip 29 formed by said counterbored portion, for a purpose hereinafter more fully explained.

The piston valve 6, between its head 7 and extension 8 is constricted, as shown at 30, for the purpose of providing a chamber $d$ between it and the sleeve 10, and in order to increase the size of this chamber $d$ and the area of the face $a$ of the piston head 7 subjected to pressure therein the sleeve 10 is counterbored as shown at 31.

When the valve 6 is in the position shown in Fig. 1, with its head 7 in contact with the end of the sleeve 10, two chambers are formed in the body 1. One of these chambers is the chamber $d$, already described, and the other chamber is indicated by $e$, and both of these chambers have one wall which is formed by the face $a$ of the piston head 7. The chamber $d$ is in communication with the source of saturated steam, through the annular chamber 15 and one of the openings 14 by means of a groove 32 formed in the inner wall of the sleeve 10, as indicated in dotted lines in Fig. 1 and in full lines in Fig. 2, and which, when the valve 6 is in the closed position, as shown in Fig. 1, extends above the packed portion of the extension 8 of the valve. The chamber $e$ communicates, by means of a bore 33 and pipe 34 (Fig. 4) with the exhaust cavity of one or both of the engine cylinders. Steam chest pressure may enter the chamber $d$ by way of a duct 36. By these means, it will be seen that the lower face $a$ of the piston head 7 is subjected to the combined influence of the pressure of saturated steam from the locomotive boiler, and the pressure of steam from the exhaust cavity, these pressures tending to move the piston valve 6 upward. However, due to the relatively low value of these combined pressures acting upon the face $a$ as compared with the unrestricted action of steam at steam chest pressure against the face $b$ of the piston head 7, as hereinafter more fully explained, the combined pressures in the chambers $d$ and $e$ will not be sufficient to raise the valve as long as the engine throttle is open and steam at steam chest pressure fills the chamber $c$ and tends to hold the valve down.

A drain 37 for water of condensation is provided for the chamber $c$, and a similar drain 38, having a suitable choke plug 39, is provided for the annular space 15.

The space within the valve 6 and sleeve 10 may drain through a duct 35 of plug 26 which, as shown, is provided with a choke plug 40.

Lubricant is supplied to the valve by means of a groove 41 surrounding the sleeve 10 and provided with communicating ports 42. When the valve is in closed position, these ports deliver the lubricant at points preferably approximately between the two rings of the upper pair of packing rings of the extension 8. When the valve is in open position, the lubricant is delivered into the space surrounding the head 27 of plug 26 and is carried thence with the inflowing steam into the engine cylinder. The groove 41 may be connected through a threaded opening 43 with a pipe 44, which pipe, as shown in Fig. 4, communicates by means of a suitable connection 45 with the pipe line 46 which delivers lubricant to the steam pipe 47 of the locomotive engine cylinders.

The operation of the device of our invention is as follows:—When the locomotive is running with the throttle open, the valve will be held in the position shown in Fig. 1 by steam pressure from the steam chests of the engine cylinders entering the chamber $c$ through the pipes 19, openings 18 and aperture 23 and acting upon the face $b$ of the head 7 of the valve. Moreover this steam chest pressure fills the chamber $d$ by way of the openings 25 and duct 36. At the same time, chamber $d$ is in communication with the source of saturated steam through pipe 17, annular space 15 and groove 32. Also pressure from the exhaust cavity of the engine cylinders is entering chamber $e$ through pipe 34 and opening 33. However, these combined pressures of saturated steam and exhaust steam are not sufficient to raise the valve from its lowermost position (Fig. 1) against the steam chest pressure in chamber $c$ as hereinbefore explained. There is, nevertheless, sufficient pressure in these spaces to raise the valve when steam chest pressure upon the face $b$ of the piston head of the valve is lowered or is cut off for the reason that steam chest pressure is in chamber $d$ and the fall of pressure in chamber $c$ is much more rapid than in chamber $d$, due to the size of duct 36 as compared with openings 18, and to the fact that chamber $d$ is supplied with steam at boiler pressure through groove 32. The value of the admission of saturated steam to chamber $d$ through groove 32 is in that when the engine throttle closes, the steam chest pressure almost immediately drops and hence the pressure entering chamber $d$ through duct 36 drops, and by feeding steam to chamber $d$ through groove 32 a pressure is maintained in chamber $d$ sufficiently high to raise the valve upon reduction of the steam chest pressure, when augmented by the exhaust pressure in chamber $e$. Consequently, when the locomotive goes into a drift, and the throttle is closed, the pressure in the steam chests of the engine cylinders and consequently in the pipes 19 and chamber $c$ is so reduced that the pressure of the steam trapped in chamber $d$ and saturated steam entering same combined with exhaust steam pressure in the chamber $e$ acting upon the head 7 overbalances the pressure in the chamber $c$ and quickly moves the valve upward to the position shown in Fig. 2, thereby causing the extension 8 to uncover the openings 14 in the sleeve 10 and permit saturated steam from the boiler to pass directly from pipe 17 through annular space 15 and openings 14 and upwardly past the head 27 of the plug 26, through the valve 6 and through the openings 25 and aperture 23 and thence through pipes 19 to the steam chests of the engine cylinders, thus applying saturated steam to the engine cylinders and preventing flashing of the lubricant therein.

It will be understood that, although the steam chest pressure, and hence the pressure in chamber $c$, drops very quickly when the engine throttle is closed and the locomotive drifts, the exhaust pressure does not drop so rapidly because it is supplied by the steam taken from the steam chests and pipe by the action of the engine pistons. Hence, the pressure in chamber $e$ is maintained sufficiently long to cause the valve to rise and to prevent escape of pressure from chamber $d$ through bore 33. Of course, as soon as the chamber $d$ communicates with chamber $e$ due to rise of the valve, the combined chambers $d$ and $e$ will be open to the exhaust, but the initial rising of the valve is rapid and the momentum imparted to the valve will cause it to continue its upward motion until the ports 14 are uncovered and then the live or saturated steam entering through these ports will complete the raising of the valve by acting against the bottom edge and lip 29 thereof. Once the valve is raised it is so held by the steam entering through ports 14 and rushing upwardly through it and exerting pressure upon the lip 29 and shoulder or restriction 30. As an example of the relative valve actuating pressures we will describe those normally obtaining in a drifting valve of this type having a piston head of a diameter of 7 inches. In such a valve the effective area of face $b$ of the head 7 is approximately 27½ sq. in., the effective area of face $a$ in chamber $e$ is approximately 20½ sq. in., and the effective area of face $a$ in chamber $d$ is approximately 1½ sq. in. Thus the face $a$ has, when the valve is closed, an effective total area of approximately 22 sq. in., as opposed to the area of 27½ sq. in. of face $b$, and it is evident that the valve cannot open in the presence of equal pressure on faces $a$ and $b$. With a boiler pressure of 200 lbs., throttle open and locomotive under working load, the steam chest pressure will be about 180 lbs., and this pressure is acting upon face $b$ to keep the valve closed, as shown in Fig. 1. Exhaust pressure of about 20 lbs. in chamber $e$ acts on face $a$ of head 7, and live or saturated steam pressure from the boiler of about 180 lbs. entering chamber $d$ by way of groove 32 also acts upon face $a$. This gives a downward pressure on face $b$ of about 4950 lbs. as against an upward pressure on face $a$ of about 680 lbs.

If now the engine throttle is closed promptly, not gradually, the steam chest pressure, and consequently pressure against face $b$, will fall rapidly, much faster than the pressure in chamber $d$, because this chamber is directly connected with the boiler by way of groove 32. Thus, if steam chest pressure falls to 5 lbs., exhaust pressure to 1 lb. and pressure in chamber $d$ to 100 lbs., we will have an effective pressure of approximately 137 lbs. on face $b$ as against an effective pressure of approximately 170 lbs. on face $a$, and the piston valve will be raised. Of course, as soon as the valve rises the chamber $d$ will be merged with chamber $e$ which is open to exhaust but the upward impulse imparted to the valve will cause it to continue to rise and when the ports 14 are thus opened the live steam entering therethrough will fully open the valve.

As long as conditions in the steam chests remain the same, and as long as the engine cylinders can exhaust the saturated steam, fed as above described, as fast as it is fed, the valve 6 will be thus held in the raised position. If, however, the engine cylinders do not use up the saturated steam as fast as it is fed to them, pressure will begin to build up in the steam chests, and in the pipes 19, and consequently in the chamber communicating with these pipes, and will move the valve 6 downward until the pressures in the chamber c and in the chamber surrounding plug head 27 and below lip 29 substantially balance due to the differential areas of head 7 and the lower annular end of extension 8.

It is under these last-mentioned conditions that the head 27 of the plug 26 functions. When the valve is in the position shown in Fig. 2 the annular opening between the extension 8 and the plug 27 is of greater area than the combined areas of the openings 14. It will be apparent therefore that as the valve moves downward and, the circumferential lip 29 approaches the head 27 of the plug it will tend to decrease the area of this annular opening through which the steam enters the interior of the valve, and will consequently relatively diminish the amount of steam fed through the valve. When, by this means, the amount of steam fed through the valve is just equal to that which can be taken care of by the engine cylinders, the valve will remain stationary. Moreover, as the pressure of the steam at openings 14 builds up below the end of extension 8 during its descent around plug 27, this pressure of steam will cushion downward movement of the valve and assist in balancing it.

When the locomotive comes to a stop, pressure of saturated steam will build up in the steam chests, pipes 19 and chamber c to an extent sufficient to completely close the valve and cut off the supply of saturated steam therethrough. Here again the head 27 of the plug 26 comes into play, in that when the circumferential lip 29 just passes below the bottom edge of the head of the plug, the steam which has been trapped in the space below the head of the plug and below the bottom of the extension 8, will escape through the enlarged annular opening thus provided, and in rushing upward past the bottom edge of the plug and the circumferential lip 29 unbalance the differential pressures theretofore established and will permit the head 7 to quickly seat upon the top of sleeve 10 under the influence of pressure in chamber c.

When the locomotive is in the round-house, saturated steam entering the chamber d will exhaust through ducts 36 and 35, and, as there is no exhaust pressure in chamber e and no steam chest pressure in chamber d, the valve will remain in its closed position, thus preventing any saturated steam from entering the engine cylinders. The pressure of exhaust steam in chamber e is just as necessary for the proper functioning of the valve under running conditions, as is the pressure of saturated steam in chamber d.

The plug 26 and its head 27 play a very important part in the proper operation of the valve, in that it is through the medium of the plug and the circumferential lip 29 of the extension 8 of the valve which cooperates therewith, that the balance of steam pressures within the valve and in the steam chests is maintained, and the feeding of an excess of steam to the engine cylinders is prevented.

In order to prevent the valve from rising with such suddenness as to hammer against the baffle or abutment 22, we provide a relatively loose piston fit between the aperture 23 and the extension 24 of the valve, so that during the last portion of the upward movement of the valve, steam will be trapped within the chamber c and will form a cushion to prevent hammering of the piston head 7 against the abutment 22, the valve finally rising to its fully elevated position after the steam trapped in the chamber c has had an opportunity to escape around the extension 24 and through the aperture 23.

Various changes are contemplated as within the spirit of the invention and the scope of the following claims.

What we claim is:—

1. In an automatic drifting valve for steam locomotives, a valve casing, means defining a chamber in said casing connected with the steam chests of the locomotive engine cylinders, means defining a chamber in said casing connected with the exhaust cavities of said cylinders, means defining a chamber in said casing connected with a source of saturated steam, and a valve mounted in said casing and providing a wall for each chamber and having means for controlling communication between the source of saturated steam and the steam chests of the engine cylinders, said valve being maintained in position to close such communication under the influence of steam chest pressure in said first-mentioned chamber when the engine throttle is open and being movable to open such communication under the influence of the combined pressures of saturated steam and exhaust steam in the other two chambers when the engine throttle is closed, and a plug in said casing and a lip on said valve cooperating with said plug for controlling the amount of saturated steam passing to the engine cylinders relatively to the position of the valve in said casing as determined by steam chest pressure and the pressure of saturated steam acting upon said valve.

2. In an automatic drifting valve for steam locomotives, a casing, means defining a chamber in said casing connected with the steam chests of the locomotive engine cylinders, means defining a chamber in said casing connected with the exhaust cavities of said cylinders, means defining a chamber in said casing connected with the locomotive boiler, a hollow piston valve mounted in said casing and forming a wall of each of said chambers and slidable in the casing under the influence of steam chest pressure and the combined pressures of saturated steam and exhaust steam acting thereon, said valve provided with means for controlling communication between the source of saturated steam and said steam chests, and a plug carried by said casing and cooperating with the interior of said valve for controlling the amount of steam passing through the interior of said valve from the source of saturated steam to said steam chests in relation to the position of said valve as determined by the closing influence thereon of steam chest pressure, and the opening influence thereon of steam direct from the boiler.

3. In an automatic drifting valve for steam locomotives, a valve casing provided with means defining a plurality of chambers therein, means for connecting said casing through one of said chambers with the valve chests of the locomotive engine cylinders, means for connecting said casing through a second of said chambers with a source of saturated steam, means for connecting said casing through a third of said chambers with the exhaust cavities of said engine cylinders, a tubular piston valve mounted in said casing and having a piston head forming a wall for each of said chambers and an extension for controlling communication between the source of saturated steam and said steam chests, said piston head subject to the influence of steam chest pressure and the combined pressures of saturated steam and exhaust steam and said extension being interiorly counterbored and having a circumferential lip adjacent to its end, and a headed plug carried by said casing, the head thereof adapted for cooperation with said counterbore and lip for controlling the passage of saturated steam through said valve to said steam chests relatively to the position of said valve in said casing as determined by the influence upon the piston head thereof of steam chest pressure and the pressure of saturated steam, to limit the amount of saturated steam admitted to said steam chests to the amount which may be used by said engine cylinders.

4. In an automatic drifting device for steam locomotives, a valve casing, means for connecting said casing with the steam chests of the locomotive engine cylinders, means for connecting said casing with the locomotive boiler, a valve mounted within said casing and movable relatively thereto for controlling communication through said casing between said boiler and said cylinders and operative when the locomotive engine throttle is closed to permit passage of steam from said boiler to said cylinders, and a member carried by said casing and with which said valve cooperates during its movement for controlling the quantity of steam passing from said boiler to said cylinders in response to the position of said valve as determined by the relative pressures of steam acting thereon and tending to open and close same.

5. In an automatic drifting device for steam locomotives, a valve casing, means for connecting said casing with the steam chests of the locomotive engine cylinders, means for connecting said casing with the locomotive boiler, a tubular piston valve mounted within said casing and movable therein for controlling passage of steam from said boiler to said steam chests, said casing provided with steam inlet ports in communication with said boiler, and said valve provided with an extension functioning to open and close said ports, and means carried by said casing and normally projecting within said extension and cooperating therewith to vary the amount of steam passing through said valve relatively to the position of the valve as determined by the pressures of steam in said steam chests and in said casing acting against said valve.

6. In an automatic drifting device for steam locomotives, a valve casing, a valve mounted in said casing and provided with a piston head, means defining a plurality of chambers within said casing, said piston head forming a wall of each of said chambers, means for introducing steam from the locomotive boiler into said casing and into one of said chambers, means for connecting said casing with the steam chests of the locomotive engine cylinders and affording communication between said steam chests and another of said chambers, a ported member carried by said casing and with which said valve cooperates for controlling the passage of steam from said boiler through said casing to said steam chests, and means for graduating the amount of steam fed from said boilers to said steam chests in proportion to the amount of steam consumed in the locomotive engine cylinders, said means comprising an extension on said valve and a cooperating plug member carried by said casing and normally projecting into said extension, said plug member functioning to restrict the tubular opening through said valve in response to the position of said extension relatively thereto as determined by the relative pressures of steam in said steam chests and in said casing acting upon said valve.

In testimony whereof we have hereunto set our hands this 28th day of July, A. D. 1925.

ARTHUR C. BECKWITH.
FORDYCE B. FARNSWORTH.